United States Patent [19]

Shimizu

[11] 4,207,970

[45] Jun. 17, 1980

[54] DISC BRAKE

[75] Inventor: Fumio Shimizu, Kawasaki, Japan

[73] Assignee: Tokico Ltd., Kawasaki, Japan

[21] Appl. No.: 877,553

[22] Filed: Feb. 10, 1978

[30] Foreign Application Priority Data

Feb. 19, 1977 [JP] Japan ............................ 52-19674[U]

[51] Int. Cl.² ............................................. F16D 65/56
[52] U.S. Cl. .................................. 188/71.9; 188/73.6
[58] Field of Search ................... 188/71.8, 71.9, 72.4, 188/73.1, 73.3, 73.6

[56] References Cited

U.S. PATENT DOCUMENTS

| | | | |
|---|---|---|---|
| 3,765,513 | 10/1973 | Brooks | 188/71.9 |
| 3,920,103 | 11/1975 | Haraikawa | 188/71.9 |
| 4,082,167 | 4/1978 | Einchcombe et al. | 188/73.6 |

FOREIGN PATENT DOCUMENTS 1965268  7/1970  Fed. Rep. of Germany .......... 188/71.8

*Primary Examiner*—Edward R. Kazenske
*Attorney, Agent, or Firm*—Wenderoth, Lind & Ponack

[57] ABSTRACT

A disc brake including a stationary member, a pair of friction pads at least one of which is slidably supported on the stationary member, a caliper slidably supported on the stationary member by at least one pin, a hydraulic piston provided in the caliper for pressing directly on a back plate of the one friction pad directly, and a lug formed on the back plate of the friction pad and engaging in a groove formed in the adjacent surface of the piston to prevent the rotation of the piston in the caliper. One of the side walls of the groove near the one pin is inclined such that the engagement between the lug and the groove can be released by rotating the caliper around the one pin.

2 Claims, 5 Drawing Figures

4,207,970

DISC BRAKE

BACKGROUND OF THE INVENTION

This invention relates to improvements in disc brakes and, particularly, to disc brakes of the type including a stationary member, a pair of friction pads at least one of which being supported slidably on the stationary member, and a caliper slidably supported on the stationary member by at least one pin means and incorporating a hydraulic piston for pressing the back plate of the aforementioned one friction pad.

Usually, the caliper of the disc brakes of the aforementioned type is supported by a pair of parallel pin means and, in applying the brakes, the back plate of one friction pad is pressed directly by the piston against one surface of a rotating disc and the caliper is moved in the opposite direction by the reaction force to urge the other friction pad against the other surface of the disc.

When a brake clearance adjusting device together with a mechanical brake applying device is incorporated in the disc brake of the aforementioned type as shown, for example, in Japanese Patent No. 657380, the rotation of the hydraulic piston must be prevented to attain a satisfactory clearance adjusting function. In such case, the rotation of the hydraulic piston is usually prevented by the engagement of the piston with the associated friction pad, and it is also known to provide a projection and recess engagement between the piston and the friction pad, as shown, in for example, Japanese Utility Model Disclosures No. 51-26290 and No. 51-36773.

In such prior art arrangements, a projection formed on the back plate of the friction pad at a position eccentric to the center of the piston and projecting toward the piston usually engages in a recess formed in the contiguous surface of the piston in the form of a radially extending groove. In releasing the engagement, the friction pad is moved radially outwards with respect to the disc or relative to the caliper. Thus, when the opening in the caliper is not large enough for allowing passage of the friction pad while exchanging the friction pad, it is necessary to disassemble the caliper completely from the disc brake.

SUMMARY OF THE INVENTION

An object of the present invention is to provide a disc brake of the aforementioned type, in which a projection or a lug is formed on the back plate of a friction pad supported on the stationary member for engaging with a groove formed in the adjacent surface of the piston to prevent the rotation of the piston in the cylinder, and at least one of the side walls of the groove is inclined with respect to a radius of the piston so that the engagement between the lug and the groove can be released by rotating the caliper around one of the pin means. Thus it is possible to avoid a complicated and time consuming operation such as complete disassembly of the caliper from the disc brake when exchanging the friction pad.

BRIEF DESCRIPTION OF THE DRAWINGS

This and other objects of the present invention will become apparent from the following description taken in conjunction with the accompanying drawings, in which.

Figure 1:
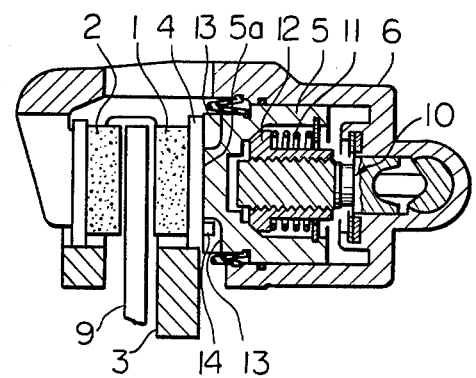
FIG. 1 is a longitudinal cross-sectional view of a disc brake according to the present invention.
Figure 2:
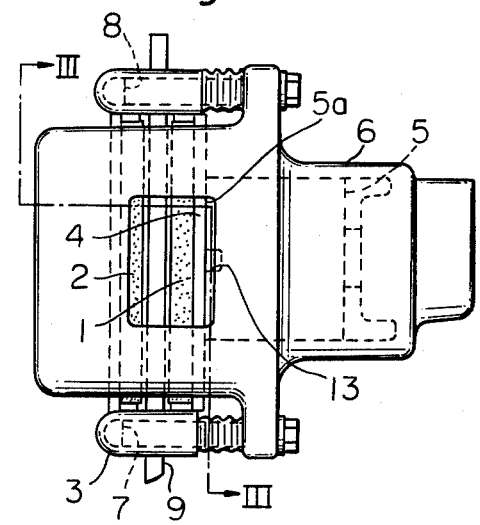
FIG. 2 is a plan view of the disc brake of FIG. 1.
Figure 3:
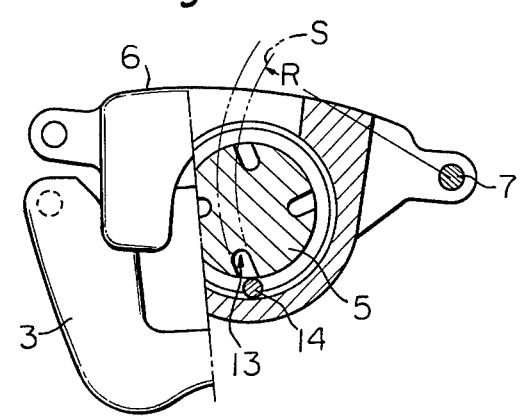
FIG. 3 is a cross-sectional view taken along line III—III in FIG. 2.

DETAILED DESCRIPTION OF THE EMBODIMENTS:

The disc brake shown in FIGS. 1, 2 and 3 comprises a stationary member 3 supporting at least one of a pair of friction pads 1 and 2 (in the drawings, the friction pads 1 and 2 are supported respectively on the stationary member 3 which straddles a portion of the periphery of a rotatable disc 9), and a caliper 6 slidably supported on the stationary member 3 by a pair of pin means 7 and 8 and incorporating a piston 5 working in a hydraulic cylinder formed in the caliper. In applying the brake, the piston 5 moves leftward in FIG. 1 and urges the friction pad 1 against one surface of the disc 9, and the reaction force caused thereby moves the caliper 6 in the rightward direction in FIG. 1 to urge the friction pad 2 against the opposite surface of the disc 9.

The disc brake further comprises a mechanical brake actuating mechanism 10 and a brake shoe clearance adjusting mechanism including an adjustor spring 11 and a nut member 12. When the wear of the friction pad 1 exceeds a predetermined amount, the nut member 12 rotates on a screw member constituting a part of the mechanical brake actuating mechanism 10 and thereby displaces the piston 5 toward the friction pad 1 to compensate for the the wear.

If the piston 5 rotates in the cylinder, the nut member 12 will be rotated accordingly, and the piston 5 will move axially in the cylinder. To avoid such undesired axial movement, it is required that rotation of the piston 5 in the cylinder be prevented. To this end, there are provided grooves 13 in the piston 5 and a projection or lug 14 on a back plate 4 of the friction pad 1 to engage in one of the grooves 13.

Figure 4:
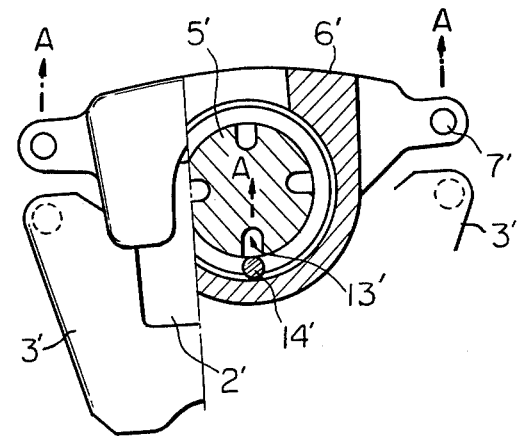
FIG. 4 is a view similar to FIG. 3 but showing a disc brake according to the prior art.

In prior art disc brakes, a plurality of radially extending grooves 13' are formed in the adjacent surface of piston 5', as shown in FIG. 4, for engaging with lug 14'. It will be noted that in FIG. 4 parts corresponding to those of FIGS. 1, 2 and 3 are denoted by the same reference numerals with a prime attached thereto. Thus, it is necessary to remove pin means 7 and 8 and to displace caliper 6' in direction of arrow A to disengage the lug 14' from the groove 13'.

According to the first embodiment of the present invention the opposite side walls of respective grooves 13 are, as shown in FIG. 3, inclined relative to the radius of the piston 5, more particularly to form respectively a part of co-axial circles (such as shown by reference S in FIG. 3) the center of which is coaxial with pin means 7, so that the engagement between the lug 14 and the groove 13 can easily be released by removing pin means 8 and rotating the caliper 6 around the other pin means 7, as shown in FIG. 3, with respect to the stationary member 3.

It will be understood that in FIGS. 3 and 4 four grooves 13' or 13 are formed in the piston 5' or 5 and only one such groove engages with lug 14' or 14. Thus, it is easy to locate the lug 14' or 14 with respect to grooves 13' or 13. But any desired number of grooves may be formed in the piston.

Figure 5:
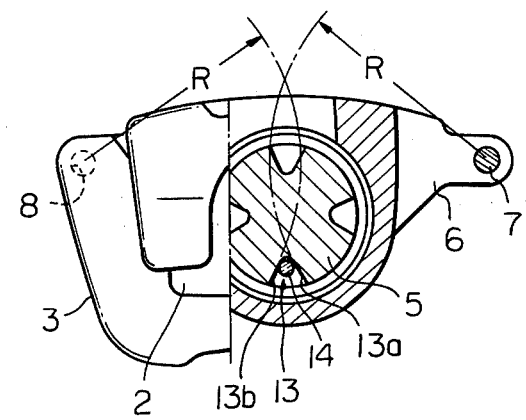
FIG. 5 is a view similar to FIG. 3 but showing a modified form of the present invention.

FIG. 5 shows a modified form of the present invention, in which opposite side walls 13a and 13b of groove 13 are inclined respectively relative to the radius of the piston such that one side wall 13a conforms generally with a part of a circle the center of which is coaxial with pin means 7 and the other side wall 13b conforms generally with a part of a circle the center of which is coaxial with pin means 8. Therefore, the engagement between the lug and the groove can easily be released by removing one of pin means 7 or 8 and rotating the caliper 6 around the other pin means 8 or 7, so that it is easy to exchange or replace the worn friction pad.

Figure 6:
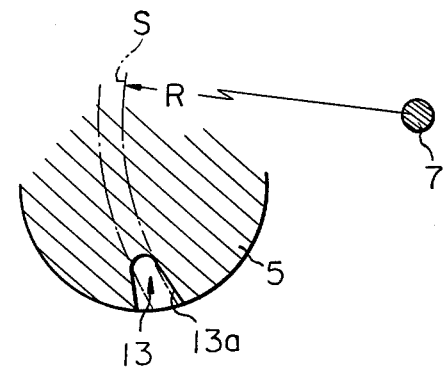
FIG. 6 is an enlarged view showing the essential portion of a further modified form of the present invention.

FIG. 6 shows another embodiment of the present invention in which the side wall 13a of the groove 13 is further inclined with respect to the circle S toward pin means 7 so that the engaging operation can be effected easier than with the embodiment of FIG. 3.

As described heretofore, the groove 13 according to the present invention is inclined such that the engagement between the lug and the groove can be released by the rotational movement of the caliper around at least one of the pin means and, when engaged with the lug the rotation of the piston in the cylinder can be reliably prevented, and in releasing the engagement, it is only required to remove one pin means and to rotate the caliper around the other pin means, whereby troublesome and time consuming operations can be avoided.

What is claimed is:

1. A disc brake comprising a stationary member, a pair of friction pads having back plates and at least one of which is slidably supported on said stationary member, a pair of pins on said stationary member both of which are removable, a caliper slidably supported on said pins on said stationary member, a piston provided in said caliper for directly pressing the back plate of said one friction pad, a mechanical brake applying mechanism and a brake clearance adjusting mechanism operatively associated with said piston and requiring that said piston be prevented from rotating in said caliper for proper operation of said adjusting mechanism, and a lug on the back plate of said one friction pad, the surface of said piston opposed to said one friction pad having at least one recess therein and said lug being engaged in said recess to prevent rotation of said piston, the sidewalls of said recess being spaced from each other for making the recess sufficiently wide to permit said lug to pass freely into and out of said recess when either one of said pins is removed and said caliper is rotated around the other of said pins, the sidewalls of said recess diverging from each other in the radially outward direction of said piston and respectively lying substantially along arcs of respective circles having said pins as corresponding centers thereof, the angle of inclination of said sidewalls with respect to a radius of said piston being sufficient for disengaging the lug and the sidewall upon rotational movement of said caliper around either of said pins.

2. A disc brake as claimed in claim 1, wherein said side walls of the recess are inclined with respect to said radius of said piston at an angle slightly greater than the angle made by the arcs of said circles with said radius of said piston.

* * * * *